(12) United States Patent
Jin

(10) Patent No.: US 9,888,233 B2
(45) Date of Patent: Feb. 6, 2018

(54) THREE-DIMENSIONAL DISPLAY SYSTEM

(71) Applicant: SHENZHEN CHINA STAR OPTOELECTRONICS TECHNOLOGY CO., LTD., Shenzhen (CN)

(72) Inventor: Yufeng Jin, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 254 days.

(21) Appl. No.: 14/778,822

(22) PCT Filed: Aug. 4, 2015

(86) PCT No.: PCT/CN2015/086027
§ 371 (c)(1),
(2) Date: Sep. 21, 2015

(87) PCT Pub. No.: WO2017/004862
PCT Pub. Date: Jan. 12, 2017

(65) Prior Publication Data
US 2017/0163976 A1    Jun. 8, 2017

(30) Foreign Application Priority Data

Jul. 3, 2015    (CN) .......................... 2015 1 0390082

(51) Int. Cl.
*H04N 13/04* (2006.01)
*G09G 3/3208* (2016.01)

(52) U.S. Cl.
CPC ....... *H04N 13/0438* (2013.01); *G09G 3/3208* (2013.01); *H04N 13/0497* (2013.01); *H04N 2213/008* (2013.01)

(58) Field of Classification Search
None
See application file for complete search history.

(56) References Cited

U.S. PATENT DOCUMENTS

| | | | |
|---|---|---|---|
| 2015/0116465 A1* | 4/2015 | Wang | H04N 13/04 348/51 |
| 2016/0080733 A1* | 3/2016 | Kim | H04N 13/0438 348/56 |
| 2016/0191907 A1* | 6/2016 | Hsu | H04N 13/0497 348/56 |

* cited by examiner

*Primary Examiner* — Eileen Adams
(74) *Attorney, Agent, or Firm* — Osha Liang LLP

(57) ABSTRACT

The present invention provides a 3D display system, which includes an OLED display panel and 3D shutter glasses. The OLED display panel includes a plurality of data lines for transmitting data signals, a plurality of scan lines for transmitting scan signals and a plurality of pixel units. When the pixel unit displays the left-eye image data signal and the right-eye image data signal, the left-eye shutter and the right-eye shutter of the 3D shutter glasses are both closed. When the pixel unit displays the left-eye blank data signal, the left-eye shutter of the 3D shutter glasses is open. When the pixel unit displays the right-eye blank data signal, the right-eye shutter of the 3D shutter glasses is open.

16 Claims, 1 Drawing Sheet

US 9,888,233 B2

THREE-DIMENSIONAL DISPLAY SYSTEM

BACKGROUND OF THE INVENTION

1. Field of the Invention

The present invention relatives to the field of display technology, particularly to a three dimensional (3D) display system.

2. Description of the Related Art

Organic Light-Emitting Diodes (OLEDs) are widely used by display manufacturers, due to the features like being self-luminous, no backlighting, high contrast, being thin, wide viewing angle, and fast response.

A 3D display system may include an OLED display panel and 3D shutter glasses. During 3D display, the OLED display panel inputs the screen with a refresh rate of 240 Hz to eliminate crosstalk between the Nth frame and the (N+1) th frame.

The signal of the OLED display panel is labeled as "11" in FIG. 1, and inputs the black image 102 between the left-eye image signal 101 and the right-eye image signal 103. 3D glasses are driven by the activation signal STV, when the OLED display panel displays the left-eye data signal 101, the 3D shutter glasses open the left-eye shutter 12. When the OLED display panel displays the left-eye data signal 102, the 3D shutter glasses open the left-eye shutter 13.

When a user watches the display screen, due to the presence of the black image 102, the actual stay time for each frame is only 50% of the time for each frame, that is, when the black image 102 is displayed, the OLED display panel does not display image screen. This results in a lower display brightness of the image screen displayed by the OLED display panel, and the driving power of the OLED display panel or the production cost of the OLED display panel needs to be increased.

Therefore, it is necessary to provide a 3D display system to solve the problem of the existing technology.

SUMMARY OF THE INVENTION

The present invention aims to provide a 3D display system with a high display brightness and low production cost to solve the technical problems of lower display brightness or high production cost of the conventional 3D display system.

To solve the aforementioned technical problems, the present invention provides a 3D display system. The 3D display system comprises:

an OLED display panel, comprising:
a plurality of data lines for transmitting data signals;
a plurality of scan lines for transmitting scan signals; and
a plurality of pixel units surrounded by the data lines and the scan lines, used for displaying the images according to the data signals and the scan signals; and
3D shutter glasses having a left eye shutter and a right-eye shutter;
wherein each frame corresponds to the data signals including a left-eye data signal or a right-eye data signal, the left-eye data signal includes a left-eye image data signal and a left-eye blank data signal, the right-eye data signal includes a right-eye image data signal and a right-eye blank data signal;
when the pixel unit displays the images of the left-eye image data signal and the right-eye image data signal, the left-eye shutter and the right-eye shutter of the 3D shutter glasses are both closed; when the pixel unit displays the left-eye blank data signal, the left-eye shutter of the 3D shutter glasses is open; when the pixel unit displays the right-eye blank data signal, the right-eye shutter of the 3D shutter glasses is open;

wherein the left-eye data signal corresponds to the display screen, the display screen displays the left-eye image data signal first, then displays the left-eye blank data signal; the right-eye data signal corresponds to the display screen, the display screen displays the right-eye image data signal first, then displays the right-eye blank data signal.

In the 3D display system of the present invention, a ratio of a display time of the left-eye image data signal to a display time of the left-eye blank data signal is 3:7 to 2:3.

In the 3D display system of the present invention, a ratio of a display time of the right-eye image data signal to a display time of the right-eye blank data signal is 3:7 to 2:3.

In the 3D display system of the present invention, a frame rate of the 3D display system is 120 Hz.

In the 3D display system of the present invention, the 3D display system is activated by an activation signal.

In the 3D display system of the present invention, when the pixel unit displays the left-eye blank signal, the data line corresponding to the pixel unit doesn't transmit any data signal.

In the 3D display system of the present invention, when the pixel unit displays the right-eye blank signal, the data line corresponding to the pixel unit doesn't transmit any data signal.

In the 3D display system of the present invention, the OLED display panel includes an infrared emitter for emitting a light with a frequency equaling to the frame rate of the OLED display panel, the 3D shutter glasses include an infrared receiver working at a frequency equaling to the frame rate of the OLED display panel, the 3D shutter glasses maintain a synchronous refresh with the OLED display panel through the infrared receiver and the infrared emitter.

The present invention provides a 3D display system, which comprises an OLED display panel, comprising:
a plurality of data lines for transmitting data signals;
a plurality of scan lines for transmitting scan signals; and
a plurality of pixel units surrounded by the data lines and the scan lines, used for displaying the images according to the data signals and the scan signals; and
3D shutter glasses having a left eye shutter and a right-eye shutter;
wherein each frame corresponding to the data signal including a left-eye data signal or a right-eye data signal, the left-eye data signal includes a left-eye image data signal and a left-eye blank data signal, the right-eye data signal includes a right-eye image data signal and a right-eye blank data signal;
when the pixel unit displays the images of the left-eye image data signal and the right-eye image data signal, the left-eye shutter and the right-eye shutter of the 3D shutter glasses are both closed; when the pixel unit displays the left-eye blank data signal, the left-eye shutter of the 3D shutter glasses is open; when the pixel unit displays the right-eye blank data signal, the right-eye shutter of the 3D shutter glasses is open.

In the 3D display system of the present invention, the left-eye data signal corresponds to the display screen, the display screen displays the left-eye image data signal first, then displays the left-eye blank data signal.

In the 3D display system of the present invention, a ratio of a display time of the left-eye image data signal to a display time of the left-eye blank data signal is 3:7 to 2:3.

In the 3D display system of the present invention, the right-eye data signal corresponds to the display screen, the display screen displays the right-eye image data signal first, then displays the right-eye blank data signal.

In the 3D display system of the present invention, a ratio of a display time of the right-eye image data signal to a display time of the right-eye blank data signal is 3:7 to 2:3.

In the 3D display system of the present invention, a frame rate of the 3D display system is 120 Hz.

In the 3D display system of the present invention, the 3D display system is activated by an activation signal.

In the 3D display system of the present invention, when the pixel unit displays the left-eye blank signal, the data line corresponding to the pixel unit doesn't transmit any data signal.

In the 3D display system of the present invention, when the pixel unit displays the right-eye blank signal, the data line corresponding to the pixel unit doesn't transmit any data signal.

In the 3D display system of the present invention, the OLED display panel includes an infrared emitter for emitting a light with a frequency equaling to the frame rate of the OLED display panel. The 3D shutter glasses include an infrared receiver working at a frequency equaling to the frame rate of the OLED display panel. The 3D shutter glasses maintain a synchronous refresh with the OLED display panel through the infrared receiver and the infrared emitter.

The 3D display system of the present invention increases the display brightness, and decreases the production cost of the display panel through resetting the display method for each frame and the method for opening/closing the 3D shutter glasses, thus solving the technical problems of lower display brightness or high production cost of the conventional 3D display system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
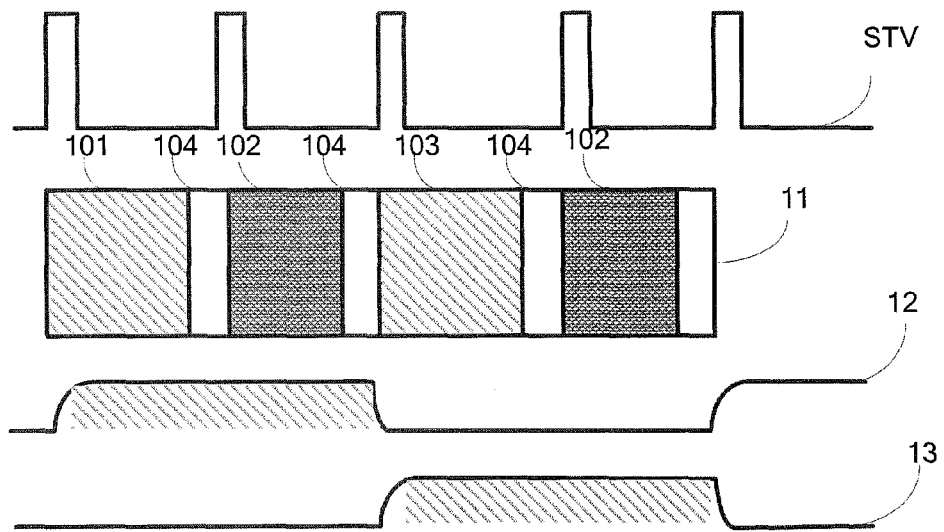
FIG. 1 illustrates a diagram of driving of the conventional 3D display system.

As used in this specification the term "embodiment" means that instance, an example or illustration. In addition, for the articles in this specification and the appended claims, "a" or "an" in general can be interpreted as "one or more" unless specified otherwise or clear from context to determine the singular form.

In the drawings, the same reference numerals denote units with similar structures.

Figure 2:
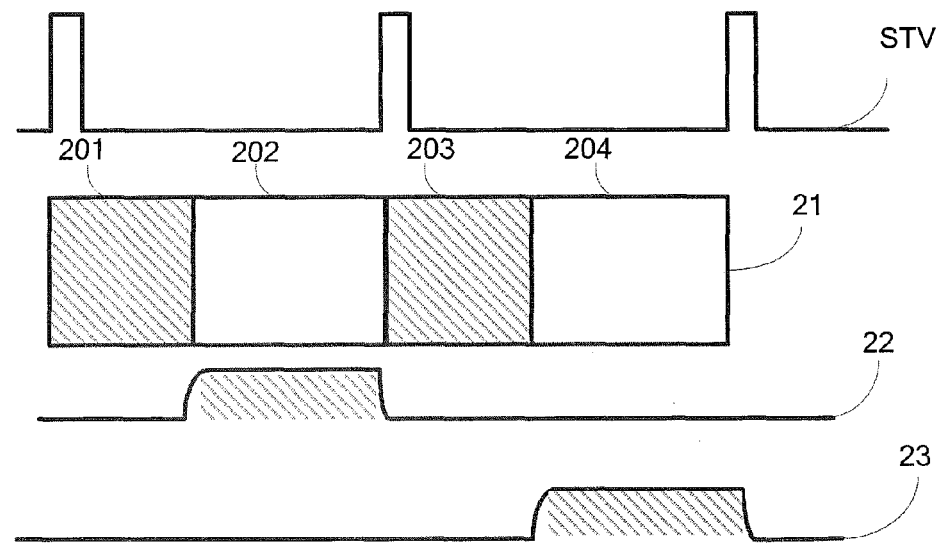
FIG. 2 illustrates a diagram the 3D display system according to a preferred embodiment of the present invention.

Refer to FIG. 2, which illustrates a diagram of the 3D display system according to a preferred embodiment of the present invention. The 3D display system according to the preferred embodiment of the present invention includes an OLED display panel and 3D shutter glasses. The OLED display panel includes a plurality of data lines, a plurality of scan lines, and a plurality of pixel units. The data lines are used for transmitting data signals. The scan lines are used for transmitting scan signals. The pixel units are surrounded by the data lines and the scan lines, and used for displaying images according to the data signals and the scan signals. The 3D shutter glasses have a left eye shutter 22 and a right-eye shutter 23. The left-eye shutter 22 is used for displaying the left-eye data signal displayed by the pixel unit, the right-eye shutter 23 is used for displaying the right-eye data signal displayed by the pixel unit.

Each frame displayed by the OLED display panel corresponds to the data signal 21, which is a left-eye or a right-eye data signal, that is, half of the screen frame is displayed on the 3D shutter glasses and is visible to the user's left eye through the left-eye shutter 22 of the 3D shutter glasses, the other half of the screen frame is displayed on the 3D shutter glasses and is visible to the user's right eye through the right-eye shutter 23 of the 3D shutter glasses, the user's brain senses the corresponding 3D screen through fusing the left eye and right-eye data signals.

In the 3D display system of the preferred embodiment, the left-eye data signal includes a left-eye image data signal 201 for displaying the left-eye data, and a left-eye blank data signal 202 for displaying blank images (no data signal transmitted); the right-eye data signal includes a right-eye image data signal 203 for displaying the left-eye data, and a right-eye blank data signal 204 for displaying blank images. The display screen to which the left-eye data signal corresponds displays the left-eye image data signal 201 first, then displays the left-eye blank data signal 202, the right-eye data signal corresponds to the display screen, the display screen to which the right-eye data signal corresponds displays the right-eye image data signal 203 first, then displays the right-eye blank data signal 204.

Because in the existing technology, the blank image 104 is disposed between the left-eye image signal 101 and the black image 102, and between the black image 102 and the right-eye image signal 103, only the left-eye image signal 101 and the blank image 104 behind the left-eye image signal can process the brightness display. The black image 102 and the blank image 104 behind the black image 102 cannot process the brightness display. Meanwhile, the 3D shutter glasses open the left-eye shutter 12 when the left-eye image signal 101 and the blank image 104 behind the left-eye image signal 101 display, and open the right-eye shutter 13 when the right-eye image signal 102 and the blank image 104 behind the right-eye image signal 102 display, therefore the brightness of the left-eye image displayed in the aforementioned two frames is displayed on the 3D shutter glasses and is visible to the user's eye through the 3D shutter glasses. Thus the brightness of the left-eye image displayed in the two frames is 50% of the total brightness in the two frames of the screen outputted by the OLED display panel.

In the 3D display system of the preferred embodiment, each image frame is not set with the black image, and therefore the left-eye image signal and the black image don't need to be disposed at different screen frames, the 3D display system of the preferred embodiment can apply a refresh frequency of 120 Hz to display (the refresh frequency of the existing 3D display system is presumed to be 240 Hz).

The 3D display system of the preferred embodiment is also driven by the activation signal STV. When the pixel unit displays the left-eye image data signal 201, the left-eye shutter 22 and the right-eye shutter 23 of the 3D shutter glasses are both closed, to avoid the crosstalk between the left-eye image data signal 201 and the right-eye image data signal 203. That is, although the left-eye image data signal 201 processes the brightness display, an image of the left-eye image data signal 201 is not visible to the user's eye through the 3D shutter glasses. When the pixel unit displays the left-eye blank data signal 202, because no data signal is transmitted from the corresponding data line, the pixel unit continues displaying the left-eye image data signal 201. Meanwhile, the left-eye shutter 22 of the 3D shutter glasses is opened, and an image of the left-eye image data signal 201 is displayed on the 3D shutter glasses and is visible to the user's eye through the left-eye shutter 22 of the 3D shutter glasses.

Then when the pixel unit displays the right-eye image data signal 203, the left-eye shutter 22 and the right-eye shutter 23 of the 3D shutter glasses are both closed to avoid the crosstalk between the left-eye image data signal 201 and the right-eye image data signal 203, that is, although the right-eye image data signal 203 processes the brightness display, it is not visible to the user's eye through the 3D shutter glasses. When the pixel unit displays the right-eye blank data signal 204, because no data signal is transmitted from the corresponding data line, the pixel unit continues displaying the right-eye image data signal 203. Meanwhile, the right-eye shutter 23 of the 3D shutter glasses is opened, and the right-eye image data signal 203 is displayed on the 3D shutter glasses and is visible to the user's eye through the right-eye shutter 23 of the 3D shutter glasses.

The brightness of the image displayed by each frame is the brightness of the left-eye blank data signal 202 or the right-eye blank data signal 204 being displayed, that is, the display time of two blank images 104 and a black image 102 of the existing technology is used for displaying the left-eye blank data signal 202 or the right-eye blank data signal 204. Then the brightness of the image displayed by each frame with the display brightness of a blank image behind the black image is more than the brightness of the left-eye image displayed by the two frames of screen of the existing technology.

If a ratio of a display time of the left-eye image data signal 201 to a display time of the left-eye blank data signal 202 is 3:7, then the brightness of the image displayed by each frame is 70% of the total brightness outputted by the frame, for example, 15%-20% higher than the brightness of the left-eye image displayed by the two frames of screen of the existing technology (some brightness loss is excluded). If a ratio of a display time of the left-eye image data signal 201 to a display time of the left-eye blank data signal 202 is 4:6, then the brightness of the image displayed by each frame is 5%-10% higher than the brightness of the left-eye image displayed by the two frames of screen of the existing technology.

Similarly, if a ratio of a display time of the right-eye image data signal 203 to a display time of the right-eye blank data signal 204 is 3:7 to 2:3, then the brightness of the image displayed by each frame is 5%-10% higher than the brightness of the right-eye image displayed by the two frames of screen of the existing technology.

Therefore, the 3D display system of the preferred embodiment realizes the effect of the black image to avoid the crosstalk through closing the left-eye shutter and the right-eye shutter of the 3D shutter glasses, thus the black image affecting the brightness output of the OLED display panel is not needed to be disposed in the frame, and increases the display brightness of the display panel without increasing the production cost of manufacturing the display panel.

Preferably, the OLED display panel of the 3D display system according to the preferred embodiment further includes an infrared emitter for emitting a light with a frequency equaling to the frame rate of the OLED display panel. The 3D shutter glasses further include an infrared receiver working at a frequency equaling to the frame rate of the OLED display panel. The 3D shutter glasses maintain a synchronous refresh with the OLED display panel through the infrared receiver and the infrared emitter.

The 3D display system of the present invention increases the display brightness and decreases the production cost of the display panel through resetting the display method for each frame and the method for opening/closing the 3D shutter glasses, thereby solving the technical problems of lower display brightness or high production cost of the conventional 3D display system.

In summary, although the present invention has been described in a preferred embodiment above, the preferred embodiment described above is not intended to limit the invention. One of ordinary skill in the art, without departing from the spirit and scope of the invention otherwise, may be used for a variety modifications and variations, so the scope of the invention defined by the claims prevails.

What is claimed is:

1. A three-dimensional (3D) display system, comprising:
an organic light emitting diode (OLED) display panel, comprising:
a plurality of data lines for transmitting data signals;
a plurality of scan lines for transmitting scan signals; and
a plurality of pixel units surrounded by the data lines and the scan lines, for displaying the images according to the data signals and the scan signals; and
3D shutter glasses having a left eye shutter and a right-eye shutter,
wherein the data signal of each frame comprises a left-eye data signal or a right-eye data signal, the left-eye data signal comprises a left-eye image data signal and a left-eye blank data signal, the right-eye data signal comprises a right-eye image data signal and a right-eye blank data signal;
when the pixel unit displays the left-eye image data signal and the right-eye image data signal, the left-eye shutter and the right-eye shutter of the 3D shutter glasses are both closed; when the pixel unit displays the left-eye blank data signal, the left-eye shutter is open; when the pixel unit displays the right-eye blank data signal, the right-eye shutter is open;
wherein upon displaying the left-eye data signal, the display screen displays the left-eye image data signal prior to the left-eye blank data signal; and upon displaying the right-eye data signal, the display screen displays the right-eye image data signal prior to the right-eye blank data signal;
wherein a ratio of a display time of the left-eye image data signal to a display time of the left-eye blank data signal is 3:7 to 2:3.

2. The 3D display system according to claim 1, wherein a ratio of a display time of the right-eye image data signal to a display time of the right-eye blank data signal is 3:7 to 2:3.

3. The 3D display system according to claim 1, wherein a frame rate of the 3D display system is 120 Hz.

4. The 3D display system according to claim 1, wherein the 3D display system is activated by an activation signal.

5. The 3D display system according to claim 1, wherein when the pixel unit displays the left-eye blank signal, the data line corresponding to the pixel unit does not transmit any data signal.

6. The 3D display system according to claim 1, wherein when the pixel unit displays the right-eye blank signal, the data line corresponding to the pixel unit does not transmit any data signal.

7. The 3D display system according to claim 1, wherein the OLED display panel comprises an infrared emitter for emitting a light with a frequency equaling to the frame rate of the OLED display panel, the 3D shutter glasses comprise an infrared receiver working at a frequency equaling to the frame rate of the OLED display panel, the 3D shutter glasses maintain a synchronous refresh with the OLED display panel through the infrared receiver and the infrared emitter.

8. A 3D display system, comprising:
   an OLED display panel, comprising:
   a plurality of data lines for transmitting data signals;
   a plurality of scan lines for transmitting scan signals; and
   a plurality of pixel units surrounded by the data lines and the scan lines, used for displaying images according to the data signals and the scan signals; and
   3D shutter glasses having a left eye shutter and a right-eye shutter;
   wherein each frame corresponding to the data signal including a left-eye data signal or a right-eye data signal, the left-eye data signal includes a left-eye image data signal and a left-eye blank data signal, the right-eye data signal includes a right-eye image data signal and a right-eye blank data signal;
   when the pixel unit displays the left-eye image data signal and the right-eye image data signal, the left-eye shutter and the right-eye shutter of the 3D shutter glasses are both closed; when the pixel unit displays the left-eye blank data signal, the left-eye shutter of the 3D shutter glasses is open; when the pixel unit displays the right-eye blank data signal, the right-eye shutter of the 3D shutter glasses is open;
   wherein a ratio of a display time of the left-eye image data signal to a display time of the left-eye blank data signal is 3:7 to 2:3.

9. The 3D display system according to claim 8, wherein upon displaying the left-eye data signal, the display screen displays the left-eye image data signal prior to the left-eye blank data signal.

10. The 3D display system according to claim 8, wherein upon displaying the right-eye data signal, the display screen displays the right-eye image data signal prior to the right-eye blank data signal.

11. The 3D display system according to claim 10, wherein a ratio of a display time of the right-eye image data signal to a display time of the right-eye blank data signal is 3:7 to 2:3.

12. The 3D display system according to claim 8, wherein a frame rate of the 3D display system is 120 Hz.

13. The 3D display system according to claim 8, wherein the 3D display system is activated by an activation signal.

14. The 3D display system according to claim 8, wherein when the pixel unit displays the left-eye blank signal, the data line corresponding to the pixel unit doesn't transmit any data signal.

15. The 3D display system according to claim 8, wherein when the pixel unit displays the right-eye blank signal, the data line corresponding to the pixel unit doesn't transmit any data signal.

16. The 3D display system according to claim 8, wherein the OLED display panel comprises an infrared emitter for emitting a light with a frequency equaling to the frame rate of the OLED display panel, the 3D shutter glasses comprises an infrared receiver working at a frequency equaling to the frame rate of the OLED display panel, the 3D shutter glasses maintain a synchronous refresh with the OLED display panel through the infrared receiver and the infrared emitter.

* * * * *